UNITED STATES PATENT OFFICE.

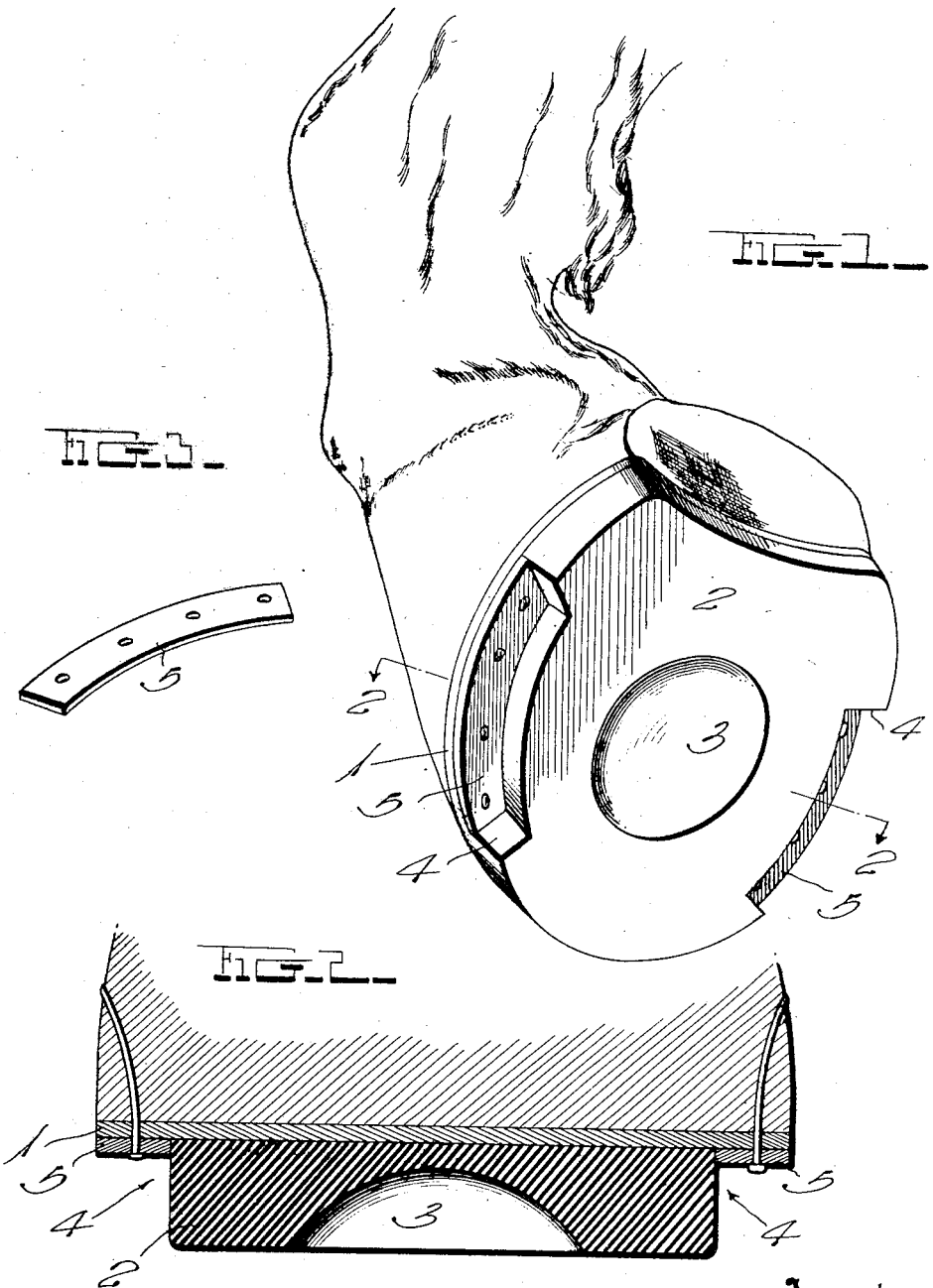

THADDEEUS S. FIELD, OF ATLANTA, GEORGIA.

HORSESHOE.

1,347,021.   Specification of Letters Patent.   Patented July 20, 1920.

Application filed November 10, 1919. Serial No. 336,943.

*To all whom it may concern:*

Be it known that I, THADDEEUS S. FIELD, a citizen of the United States, residing at Atlanta, in the county of Fulton and State of Georgia, have invented certain new and useful Improvements in Horseshoes; and I do declare the following to be a full, clear, and exact description of the invention, such as will enable others skilled in the art to which it appertains to make and use the same.

This invention relates to improvements in horseshoes.

The primary object of the invention is to provide a cushion horseshoe or other shoe capable of adjusting itself to conform to the shape of the hoof of the animal upon which it is placed, and which employs a minimum amount of metal arranged and placed so it will not contact with the ground or paving.

With the above and other objects in view the invention consists of certain novel features of construction and the combination and arrangement of parts as will be more fully described and claimed.

I attain these objects by the construction illustrated in the accompanying drawing, in which—

Figure 1 is a perspective view showing the shoe applied to a hoof;

Fig. 2 is a section on line 2—2 of Fig. 1; and

Fig. 3 a detail perspective view of an attaching plate.

Similar reference numerals designate similar parts throughout the several views.

Reference is now had to the drawing in which a shoe is shown applied to a horse's hoof, said shoe comprising a backing sheet 1 formed of belting, duck, or other tough non-resilient material. These sheets are shaped to fit the horse's hoof and of course vary in size.

Vulcanized or otherwise suitably secured to one side of the backing sheet 1, is a block 2 formed of rubber or the like resilient material, said block being shaped to fit the sheet 1. Formed in the outer face of the rubber block 2 is a recess 3, forming a vacuum cup, whose function is to prevent slipping, when the shoe is attached to a horse's hoof.

In order that the shoe may be readily attached to a hoof, by inexperienced persons and others, I have provided arcuate cutaway portions 4 in each side edge of the block 2, so that arcuate attaching plates 5 may be positioned in the cutaway portions in direct contact with the backing sheet 1. Nails or the like fastening elements are then driven through said attaching plates and the backing sheet, into the horse's hoof to retain the shoe thereon.

It is readily seen that, by the construction illustrated, no metal will strike the ground or paving to jar or shock the animal's legs, and the vacuum cup will tend to prevent slipping.

The shoe is of very simple but durable and inexpensive construction, and by reason of the fact that the backing 1 and block 2 are flexible, it will, while being applied, adjust itself to conform to the exact shape of the hoof. It may be applied with equal success to both sound and unsound hoofs. If necessary the attaching plates 5 may be shifted forwardly or rearwardly or even sidewise by simply cutting away the walls of the cutaway portions 4, this being done in order that the nails may be driven into the sound portions of the hoof.

From the foregoing description taken in connection with the accompanying drawing, the construction and operation of the invention will be readily understood without requiring a more extended explanation.

Various changes in the form, proportion and minor details of construction may be resorted to without sacrificing any of the advantages of the claimed invention.

I claim:

A cushion horseshoe or other shoe adapted, when being applied to a hoof, to adjust itself to conform to the shape of the hoof; said shoe comprising a backing sheet of tough flexible non-resilient material adapted to fit next to the bottom of the hoof and being shaped to conform to the contour thereof; a cushion block of flexible resilient material fastened flat against the lower side of said sheet and having its contour shaped to conform to the contour of said sheet, except at its side edges where it is provided with arcuate cutaway portions, the central portion of the lower surface of said block having a recess therein; and flat arcuate attaching plates of stiff material disposed in said cutaway portions and fitting flat against the lower side of said sheet, said plates being adapted to receive and to carry securing elements by which the shoe may be attached to the hoof, the thickness of said plates being considerably less than the thickness of said block so that said plates will not contact with the ground or paving.

In testimony whereof I have hereunto set my hand.

THADDEEUS S. FIELD.